3,165,563
METHOD FOR THE PRODUCTION OF A FIBROUS MATERIAL
Ole-Bendt Rasmussen, Charlottenlund, Denmark, assignor to Phillips Petroleum Company, Bartlesville, Okla., a corporation of Delaware
Filed June 22, 1960, Ser. No. 38,412
Claims priority, application Denmark June 25, 1959
6 Claims. (Cl. 264—22)

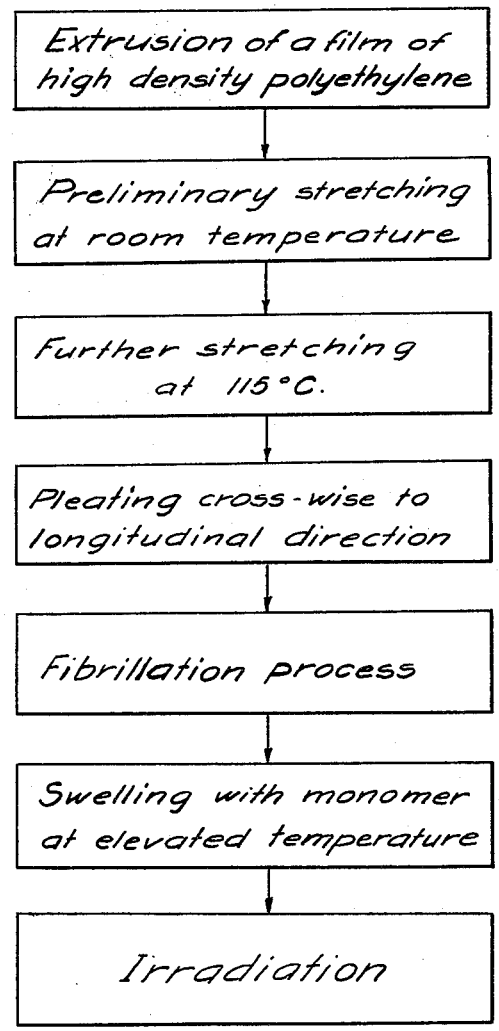

The invention relates to a method for the production of a fibrous material from a high-molecular weight organic substance, whereby the said substance is formed into films or bands, which are stretched to impart an orienting, and then split up to a coherent network of fibres.

It is known that a molecular orienting can be imparted to a number of organic synthetic high-molecular weight polymers, particularly linear high-molecular weight polymers, and also modified or regenerated high-molecular weight natural substances can be subjected to a molecular orienting by stretching, which is generally best done while heating to a temperature close to the melting point of the substance, and it is further known that the resulting orienting greatly facilitates the fibrillation of the substance by a mechanical or chemical, or both mechanical and chemical action.

The splitting is easier when the degree of orienting is higher, and it is advantageous, therefore, to impart a high degree of orienting to the substance by stretching as much as possible, possibly in additional turns, whereby, independent of the nature of the substance, an extension can be obtained without rupture, amounting to 4–25 times the original length of the band or film formed from the substance.

As stated, the splitting can be effected in various manners, which are known per se and do not form part of the present invention.

It is an object of the invention to produce a fibrous material of the said kind, which is particularly suited for the production of strong, highly porous yarns, and with this object in view the present method is characterized in that crosswise to the longitudinal direction of the fibres the network, which is produced by stretching and splitting, is spread to a wide-meshed state, and subjected to a treatment whereby the said state is fixed.

The best results are obtained by using a split material having particularly fine and short, coherent fibres, because this gives a fine-meshed network, the polygonal structure of which gives good form stability in the yarns produced from the network.

In the simplest form, the present method is carried out by heating the film or band on one side only after fibrillation and twisting, for example in contact with a heating surface, thereby, the fibres touching the heating surface will shrink and become shorter than the remaining fibres which must, therefore, flex to form the wide-meshed network. The same result can be obtained if after splitting, the material is smoothed out and heated in spots or zones.

After the stretching and splitting processes, the film or band will often be uneven and partly rolled up which may hinder the spreading process. Therefore, it is expedient, according to the invention, that the split film or band be spread and fixed only after being subjected to a smoothing out to the original width of the film or band, because this makes the spreading process substantially easier. Such smoothing may for example be obtained by electrostatic charging combined with a mechanical action upon the film or band.

Still more expediently, the splitting is carried out under such conditions that rolling up and bulging is prevented, for example by clamping the film or band between rubber surfaces, or by carrying it tautly over rollers during the splitting to thereby eliminate the smoothing process.

The spreading can be carried out in various manners. Thus a manner known from the stretching of films can be applied, in which the opposite borders are clamped between pairs of claws which move gradually away from each other during the advance of the band or film. Owing to the different lengths of the fissures produced by the splitting, and because there is still a certain cohesion between the fibres in the split band or film, however, the spreading results in a fairly uneven network with several ruptured fibres so that large holes occur in the network.

A substantially better result is obtained according to the invention when the split film or band is spread by being clamped between elastic bands which are stretched in the desired direction of spreading. The clamping should be so slight that the single fibres are able to slip between the bands during the spreading but, on the other hand, the bands should have a surface providing a certain friction to be overcome before the fibres slip. These requirements can be satisfied, for example, by using rubber bands with a surface layer of a foamed plastic, such as foamed nylon, whereby a considerable improvement is obtained of the distribution of the tension over the width of the band or film as compared with the manner of spreading previously described, and consequently a more uniform size of the meshes in the network.

However, this method also results in a rupture of many of the fibres which is generally undesirable unless the fibrous material is intended for the production of a very fleecy yarn, and in order to avoid ruptures of the fibres as far as it is possible, the spreading is carried out, according to the invention, after a previous pleating of the split film or band. Thereby, the individual fibres are brought into a wavy form and must first be straightened, before a rupture can take place. Even if, therefore, the spreading process results in an uneven tension of the various fibres, the straightening of the fibres exposed to the strongest tension will equalize the differences and prevent rupture. Accordingly, this method results in a network with small meshes or openings of a substantially uniform size.

After the spreading, the network of fibres has to be fixed so that the material does not spontaneously shrink again. In an expedient embodiment of the present method, this fixation is carried out by heating. After spreading, the network may for example be introduced between two supporting bands exerting a pressure from each side which is sufficient, but not substantially higher than necessary to keep the network in the spread state. The supporting bands carry the network over a heater which increases the temperature until it is near the melting point of the material. This results in an equalizing of the tensions because fibres, which are under tension in the semiplastic state imparted to the material by the temperature increase, will be stretched, whereas tensionless fibres will shrink. When the material is subsequently cooled, it solidifies, and the network is fixed in the spread or distended state. It constitutes a coarse yarn which can be twisted or rolled to a finished yarn of uncommonly highly porous character.

If desired, the supporting bands can be provided with matching projections and depressions on the surfaces facing each other, which results in the network getting a correspondingly wavy or frizzy structure contributing to the porosity of the finished yarn.

In another embodiment the fixation is carried out by swelling. This swelling may be combined with a heat treatment by passing the spread network of fibres through hot vapours of a swelling agent which, for instance, may be superheated steam when the material is a polyamide. The swelling also results in an equalizing of the differences of tension in the fibres, thus fixing the network in the distended state.

The fixation may also be carried out by spraying a solution of a high-molecular weight polymer onto the distended network, whereafter the solvent is evaporated. Thereby, a layer of the dissolved substance is deposited around the junctions of the network, and the latter is fixed.

According to the invention, the fixation may further be brought about by a chemical treatment, producing cross-links in the high-polymer. As an example, the treatment of polyvinyl alcohol with a dialdehyde may be mentioned.

It is also possible to carry out a fixation simultaneously increasing the elasticity of the fibres, whereby the yarn, which is produced from the material, becomes more porous. According to the invention, such a fixation can be produced by irradiation with ultraviolet rays, X-rays or by radioactive irradiation. For example, linear polyethylene can be fixed by a radioactive irradiation of the magnitude of 10 megaroentgens at a temperature of 90° C. in an indifferent atmosphere, such as a nitrogen atmosphere. The irradiation results in cross-linkings in the high-molecular weight polymer, whereby the elasticity is increased. The same is obtained by irradiation at room temperature with subsequent heating to about 900 C. for some minutes. A radioactive hardening can also be applied to other polymers, for example polyamides, such as nylon.

The radioactive irraditaion can be produced, for example, by means of radioactive cobalt, or of accelerated electrons.

In ultraviolet irradiation, it will generally be necessary that the fibrous network be produced from specially prepared films in which the material has been made susceptible to the ultraviolet irradiation in a manner known per se.

According to the invention, the fixation can also be carried out by means of a so-called graft-polymerization of the high-molecular substance, combined with an irradiation. For example, a split and distended fibrous network of high-pressure polyethylene may be treated with styrene, or with a mixture of styrene and dimethylbutadiene, at increased temperature, whereafter the material is irradiated.

A really good combination of softness and porosity is obtained by a fixation by means of irradiation when the latter is carried out, according to the invention, in such a manner that more strongly irradiated zones alternate with less or not irradiated zones. This can be obtained by covering the fibrous network with a screen with meshes of for example 1/10 mm. during the passage through the irradiation zone, or by using intermittent irradiation. This results in a fixed fibrous network in which the individual fibres consist of hard parts alternating with less hard parts in analogy with the structure of the molecules in natural silk.

Finally, it may sometimes be advantageous to use a combination of the described fixation methods.

The accompanying drawing contains a flow sheet diagrammatically showing the preferred manner of producing the fibrous material of the present invention.

A film of high density polyethylene is poduced by an extrusion process and oriented by a preliminary stretching at room temperature, followed by a stretching at 115° C. In the preliminary stretching, the length is increased to about twice the original length, and the final stretching may increase the length to 6 times the original length or more, depending on the ductility of the material.

After stretching, a fine pleating cross-wise to the longitudinal direction of the stretched film is carried out, and the pleated material is subjected to a fibrillation process in known manner by a mechanical treatment of the pleated film while sandwiched between endless rubber bands. In my copending U.S. Patent application Serial No. 543,983, filed October 31, 1955, a fibrillation process is described which is suitable for use in the present invention. Said application is now U.S. Patent 3,003,304. By the fibrillation process, splits or fissures are produced in the oriented film to form a structure of coherent fibres, and by lateral stretching of the rubber bands while advancing, the fiber structure is spread to a fine-meshed network of coherent fibres. This network is heated to 90° C., and treated with a solution or dispersion of a rubber monomer, which produces a swelling of the fibres, and is then subjected to a spotwise radioactive irradiation of 10 megaroentgens for 2 minutes in a nitrogen atmosphere, the parts not to be irradiated being suitably covered.

I claim:
1. The method of producing a fibrous material from an orientable polymer, which comprise stretching a film of the said polymer to impart an orienting, splitting the oriented film to form a network of coherent fibres, spreading said network cross-wise to the longitudinal direction to a wide-meshed state, and fixing the network in the spread state.

2. The method of claim 1, in which the film is spread by being clamped between elastic bands which are stretched in the desired direction of spreading.

3. The method of claim 1, in which the spread network is fixed by heating.

4. The method of claim 1, in which the spread network is fixed by swelling.

5. The method of claim 1 in which the fixation is effected by subjecting the network to cross-linking by the action of ionizing irradiation.

6. The method of producing a fibrous material from high density polyethylene, which comprises forming a film of the polyethylene by extrusion, orienting said film by preliminary stretching at room temperature, followed by further stretching at an elevated temperature, finely pleating the oriented film cross-wise to the longitudinal diıection, subjecting the pleated film to a fibrillation process in known manner to form coherent fibres, spreading the fibrous material to a fine-meshed network of fibres, treating said network with a liquid containing a rubber monomer, and irradiating at elevated temperature to produce cross-linking and fixation of the network of fibres in the spread state.

References Cited in the file of this patent

UNITED STATES PATENTS

| | | |
|---|---|---|
| 2,185,789 | Jacque | Jan. 2, 1940 |
| 2,486,217 | Slack et al. | Oct. 25, 1949 |
| 2,626,422 | Lammertse | Jan. 27, 1953 |
| 2,728,950 | Annesser | Jan. 3, 1956 |
| 2,853,741 | Costa et al. | Sept. 30, 1958 |
| 2,874,408 | Vieli et al. | Feb. 24, 1959 |
| 2,910,723 | Traver | Nov. 3, 1959 |
| 3,058,160 | Mocker et al. | Oct. 16, 1962 |